(12) United States Patent
Price

(10) Patent No.: US 6,573,841 B2
(45) Date of Patent: Jun. 3, 2003

(54) GLIDE RANGE DEPICTION FOR ELECTRONIC FLIGHT INSTRUMENT DISPLAYS

(75) Inventor: Ricardo A. Price, Kingwood, TX (US)

(73) Assignee: Chelton Flight Systems Inc., Boise, ID (US)

(*) Notice: Subject to any disclaimer, the term of this patent is extended or adjusted under 35 U.S.C. 154(b) by 0 days.

(21) Appl. No.: 09/824,181

(22) Filed: Apr. 2, 2001

(65) Prior Publication Data
US 2002/0140578 A1 Oct. 3, 2002

(51) Int. Cl.⁷ .............................................. G08B 23/00
(52) U.S. Cl. ........................................ 340/963; 701/16
(58) Field of Search ................................. 340/963, 945, 340/967, 971, 976; 701/6, 9, 14, 16, 18

(56) References Cited

U.S. PATENT DOCUMENTS

| | | | |
|---|---|---|---|
| 4,024,539 A | 5/1977 | Quinlivan et al. | |
| 4,210,930 A | 7/1980 | Henry | |
| 4,247,843 A | 1/1981 | Miller et al. | |
| 4,390,950 A | 6/1983 | Muller | |
| 4,419,079 A | 12/1983 | Georges et al. | |
| 4,454,496 A | 6/1984 | Lowe | |
| 4,534,000 A | 8/1985 | Bliss | |
| 4,538,229 A * | 8/1985 | Baltzer et al. ................ 701/16 |
| 4,554,545 A | 11/1985 | Lowe | |
| 4,559,822 A * | 12/1985 | Huntington ............... 73/178 R |
| 4,860,007 A | 8/1989 | Konicke et al. | |
| 4,868,916 A * | 9/1989 | Ablov et al. ................. 340/970 |
| 5,003,305 A | 3/1991 | Kelly et al. | |
| 5,015,188 A | 5/1991 | Pellsie, Jr. et al. | |
| 5,136,301 A | 8/1992 | Bechtold et al. | |
| 5,142,480 A * | 8/1992 | Morrow ..................... 701/219 |
| 5,150,117 A | 9/1992 | Hamilton et al. | |
| 5,196,847 A * | 3/1993 | Bateman .................... 340/970 |
| 5,296,854 A | 3/1994 | Hamilton et al. | |
| 5,343,395 A | 8/1994 | Watts | |
| 5,357,263 A | 10/1994 | Fischer et al. | |
| 5,359,890 A | 11/1994 | Fulton et al. | |
| 5,412,382 A | 5/1995 | Leard et al. | |
| 5,420,582 A | 5/1995 | Kubbat et al. | |
| 5,459,666 A | 10/1995 | Casper et al. | |
| 5,595,357 A | 1/1997 | Catlin et al. | |
| 5,654,890 A | 8/1997 | Nicosia et al. | |
| 5,666,111 A | 9/1997 | Servat et al. | |
| 5,668,542 A | 9/1997 | Wright | |
| 5,844,504 A | 12/1998 | Etherington | |
| 5,978,715 A | 11/1999 | Brieffe et al. | |
| 6,199,008 B1 * | 3/2001 | Aratow et al. .............. 701/120 |
| 6,317,690 B1 * | 11/2001 | Gia ............................ 701/301 |

* cited by examiner

*Primary Examiner*—John Tweel
(74) *Attorney, Agent, or Firm*—Fulbright & Jaworski L.L.P.

(57) ABSTRACT

The present invention is directed to novel methods for depicting glide range on moving map displays and on perspective-view primary flight displays. These methods involve processing data gathered from various aircraft sensors and, using a variety of electronic databases, generating intuitive symbols that aid the pilot.

12 Claims, 3 Drawing Sheets

GLIDE RANGE DEPICTION FOR ELECTRONIC FLIGHT INSTRUMENT DISPLAYS

BACKGROUND OF THE INVENTION

1. Field of the Invention

The present invention generally relates to the field of electronic flight instrument systems ("EFIS") and, in particular, moving map displays and primary flight displays presented on electronic screens in aircraft cockpits.

2. Description of the Prior Art

It is well known in the art to provide a display presented on an electronic screen in an aircraft cockpit (known in the art as a "glass cockpit"). Most modern commercial and military aircraft have several electronic screens capable of presenting primary flight displays, moving maps or horizontal situation displays, engine parameter displays, and other displays. The present invention is directed to improvements and novel concepts related to the depiction of glide range on moving map displays and primary flight displays presented on electronic screens.

It is known to generate a moving map using navigational symbols whose parameters are stored in electronic memory. It is also known to integrate other types of data onto such moving maps to relay information to the pilot from a vertical perspective. Thus, in some embodiments prior art moving maps offer the capability of integrating lightning strike information, traffic information, radar information, data-link weather and traffic information, geographic information, and bit-mapped graphical chart information with the aforementioned navigational symbol database. However, presentation of aircraft glide range on moving maps is not known in the current state of the art.

The primary flight display of the prior art consists of an electronic presentation of conventional flight data on a single screen. In other words, the symbology and information that would have been presented on separate airspeed indicators, altimeters, vertical speed indicators, artificial horizon/flight directors, and, in some cases, directional indicator/horizontal situation indicators, in pre-glass cockpit aircraft are presented together on a single display known as a primary flight display. Examples of such prior art primary flight displays can be seen in U.S. Pat. Nos. 4,860,007, 5,136,301, 5,359,890, 5,412,382, 5,844,504, and 5,978,715. It is also known to present a perspective background on primary flight displays. An example is shown in U.S. Pat. No. 5,420,582. However, as with moving map depictions, perspective presentation of aircraft glide range on a primary flight display is not known.

The glide range of an aircraft is a critical parameter for single engine aircraft or multi-engine aircraft that are unable to maintain level flight after an engine failure. During the first moments after an engine failure, the pilot is tasked with immediately achieving an optimal glide speed and selecting a flight path to a safe touchdown point. The selection of an emergency flight path is complicated by the effects of wind and terrain. Thus, a pilot aid for achieving the best emergency flight path is needed. These needs are met by the present invention.

SUMMARY OF THE INVENTION

The present invention is directed to novel methods for depicting glide range on moving map displays and on perspective-view primary flight displays. These methods involve processing data gathered from various aircraft sensors and, using a variety of electronic databases, generating intuitive symbols that aid the pilot.

The moving map of the present invention displays about an aircraft symbol a computed intersection of the aircraft's glide and the terrain. The intersection computation may take into consideration external factors such as wind and terrain elevations. The computation further takes into consideration aircraft specific factors such as glide ratio, configuration, weight, center of gravity, altitude, airspeed, and heading. The safe glide area may be shown by a boundary line, shaded area or other means. Likewise, the safe glide area may be converted to perspective view and shown on the primary flight display. It is also an object of the present invention to display optimal glide speed. Factors that may be included in the optimal glide speed computation include wind, weight, center of gravity, configuration, and altitude.

Other objects, advantages and novel features of the present invention will become apparent from the following detailed description of the invention, when considered in conjunction with the accompanying drawings.

DESCRIPTION OF THE PREFERRED EMBODIMENT

Figure 1:
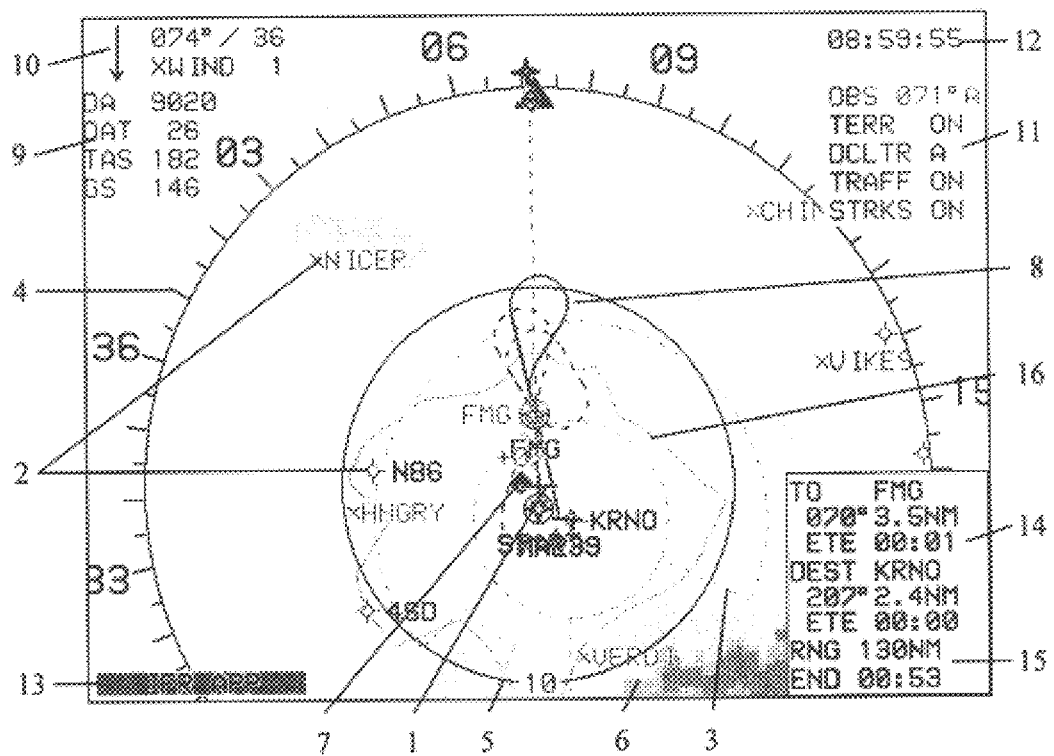
FIG. 1 shows a moving map display according to the present invention.

Referring now to FIG. 1, an embodiment of the present invention is disclosed. FIG. 1 depicts a moving map display showing aerial navigation data such as the pilot position or own aircraft symbol 1, airports and navigation aids 2, special use airspace 3, a compass rose 4, a range ring 5, and terrain 6. The moving map also overlays traffic symbology 7, weather symbology (not shown in FIG. 1), and flight routes 8 in a manner well understood in the art. Air data information 9, including wind 10, is shown in the upper left corner of the display. Display status information 11 and clock functions 12 are shown in the upper right corner of the display. The lower left corner is reserved for system warnings, cautions and alarms 13 while the lower right hand corner presents flight plan data 14 and fuel totalizer data 15.

In addition to the above features, FIG. 1 also displays the aircraft's safe glide range with a boundary line 16, shading or other means. The safe glide range area often takes on irregular shapes primarily due to the effects of turn, terrain and wind although other variables also have an effect. In FIG. 1, the safe glide range area defined by boundary line 16 is continuously computed and updated on the display. Thus, with a glance the pilot can immediately determine whether there are airports within safe gliding range and the optimal direction for an emergency glide.

Figure 2:
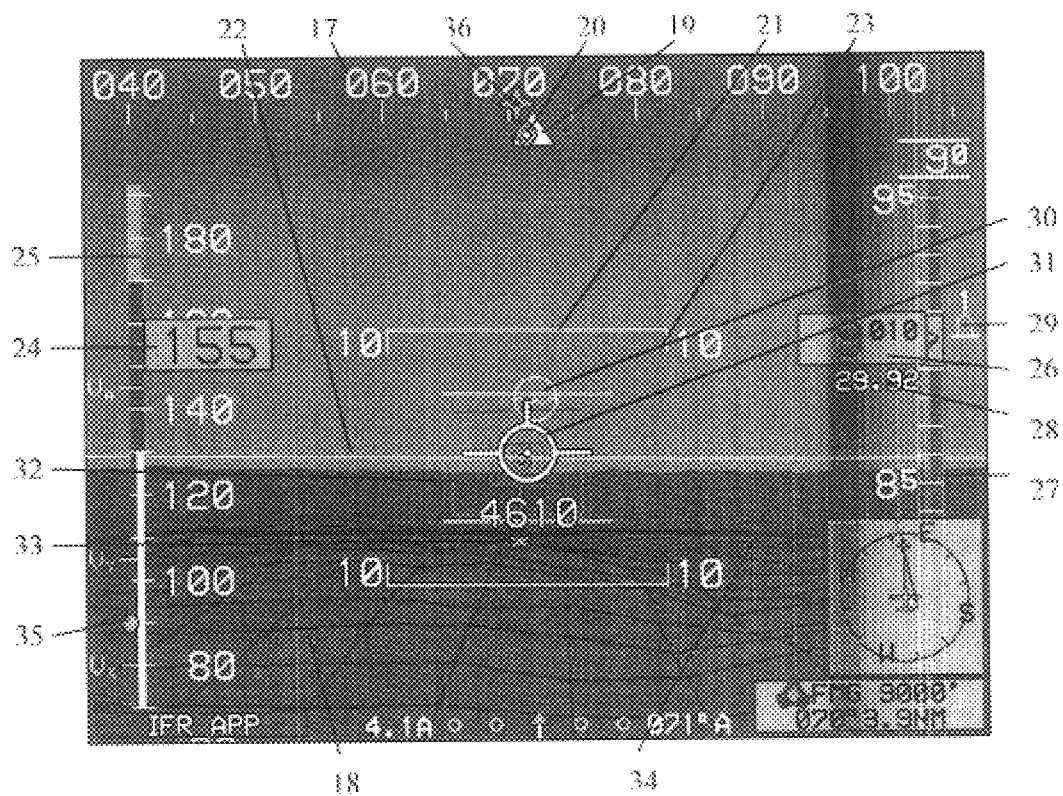
FIG. 2 shows a primary flight display according to the present invention.

FIG. 2 depicts a primary flight display alternative embodiment of the present invention. The primary flight display includes a heading scale 17 across the top. The digits of the heading scale are spaced so that, at an aircraft roll angle of zero, the digits conform to the three-dimensional primary flight display background 18. The background 18 is generated from terrain elevation and obstruction elevation data stored in electronic memory. The heading scale 17 includes a heading carat 19 aligned with the longitudinal axis of the aircraft, a track pointer 20 aligned with the aircraft's track across the earth, and a waypoint pointer 36 indicating the bearing to the active waypoint.

The primary flight display of FIG. 2 further includes a pitch scale 21 and horizon line 22 that rotate in conjunction with the background 18 according to the aircraft's roll angle. The increments on the pitch scale 21 are spaced to conform to the background 18. Pointer bars 23 at the ends of each numbered pitch scale bar indicate the direction to the horizon.

The primary flight display of FIG. 2 further includes an airspeed box 24 and airspeed scale 25. The airspeed scale also includes colored regions to conform to applicable regulatory requirements and to indicate the relationship of indicated airspeed to stalling speeds, flap extension speeds, structural cruising speeds, never exceed speeds and other speeds of interest to the pilot.

The primary flight display of FIG. 2 further includes an altitude box 26 with altitude scale 27 and altimeter setting 28. The primary flight display further includes a vertical speed indicator scale with pointer 29.

Fixed in the center of the primary flight display so as to align with the longitudinal axis of the aircraft is a waterline symbol 30. Rotation of the background 18 and pitch scale 21 occurs relative to the waterline symbol 30. A flight path marker 31 appears on the background 18 so as to coincide with the aircraft's actual flight path as projected upon the outside world.

The primary flight display of FIG. 2 further includes a full complement of three-dimensional navigation symbology such as highway-in-the-sky boxes 32, three-dimensional runway depictions (not shown in FIG. 1), and "tethered balloon" waypoint symbols 33.

In addition to the above features, the primary flight display of FIG. 2 also displays the aircraft's safe glide range. The glide range corresponds to the depiction on the moving map display with the exception that on the primary flight display the glide range is shown in perspective. The perspective glide range has the same scale and is aligned with the background 18 to readily indicate to the pilot what navigation targets in the forward field of view can be achieved and the type of terrain to expect at the end of the glide. The safe glide range area is shown with a boundary line 34 and is continuously computed and updated on the display.

The primary flight display of FIG. 2 also depicts best glide speed as a green "dot" 35 on the airspeed scale 25. Best glide speed is continuously computed and displayed using algorithms well known in the art. Factors that may be included in the computation include wind, weight, center of gravity, configuration, and altitude. The number of factors considered depends upon the sensor set installed in the aircraft. The greater the number of factors considered the more accurate the resulting optimal glide speed computation becomes.

Figure 3:
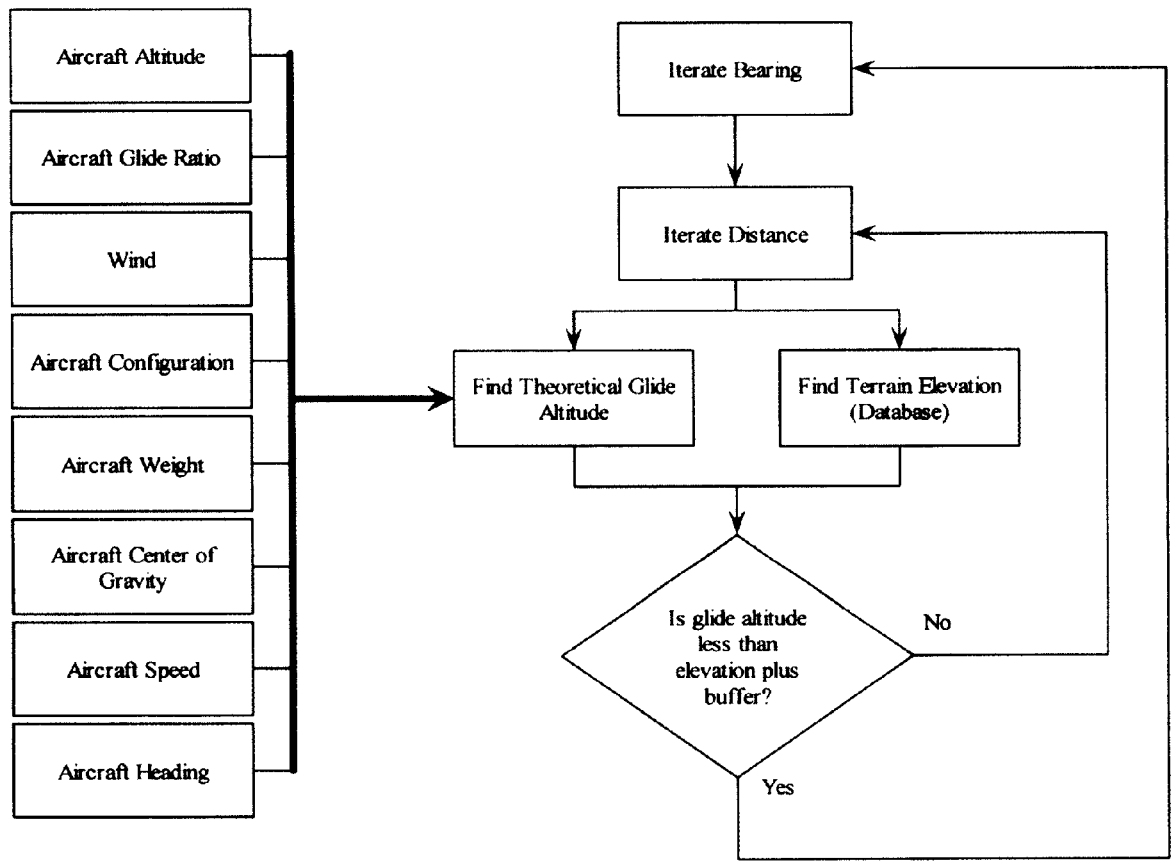
FIG. 3 shows a block diagram showing a methodology for deriving glide range in accordance with the present invention.

Referring now to FIG. 3, a method for computing glide range in the preferred embodiment is disclosed. The computation is an iterative process in which the computed intersection of the aircraft's glide and the terrain is found for a sequence of bearings about the aircraft. For the moving map display, the sequence of bearings should encompass a full 360 degrees about the aircraft. For the primary flight display, the sequence of bearings can be abbreviated to those found in the primary flight display field of view. For each bearing, the computation considers a series of points of increasing distance from the aircraft. The elevation of each point is found from the terrain elevation database and is compared to a theoretical glide altitude at that bearing and distance. The distance iteration continues until the theoretical glide altitude is within a certain height above the terrain elevation ("buffer height"). A buffer height of 200 feet may be used for a generic, low-speed general aviation aircraft. When the difference between the theoretical glide altitude and the terrain elevation is within the buffer height, that point is stored as the intersection for the bearing in question, and the algorithm iterates to the next bearing.

Calculation of the theoretical glide altitude can encompass a variety of factors. At a minimum, the calculation should consider the aircraft's altitude and glide ratio. Beyond that, the calculation can take into account wind, configuration, weight, center of gravity, airspeed and heading. As with the determination of glide speed, the greater the number of factors considered the more accurate the resulting glide altitude computation becomes.

The effect of wind is to shorten glide distances when gliding with a headwind and to extend glide distance when gliding with a tailwind. With the proper sensors, instantaneous wind can be continuously updated and applied to the glide calculation. Wind at other altitudes may be determined from external sources varying from preflight weather briefings to current weather data uplinked to the aircraft.

Aircraft configuration, weight and center of gravity have the effect of changing the aircraft's glide ratio. This information would typically be stored in a database determined from aircraft test flights or aerodynamic analysis. Weight and center of gravity may either be sensed or user-input into the flight system. Aircraft configuration may be determined by sensors arranged to detect the deployment of landing gear and flight surfaces. In multi-engine aircraft, a further set of data may be stored and recalled based upon glide ratios for specific engine out configurations.

Airspeed has the effect of extending or decreasing the glide range depending upon whether the aircraft is flying faster or slower than the best glide speed respectively. The postponement of altitude loss for speeds higher than best glide speed and the increased altitude loss to achieve best glide speed for speeds lower than best glide speed can either be computed from an aerodynamic model or derived from a stored database. The extension or decrease in glide range due to airspeed is also dependent upon configuration, weight, and center of gravity.

Heading will decrease the glide range for any destination bearing that requires a turn. The greater the amount of turn, the more altitude is expended in achieving the destination bearing. Like airspeed, this data can be computed from aerodynamic modeling or derived from a stored database and is affected by configuration, weight, and center of gravity.

It will therefore be readily understood by those persons skilled in the art that the present invention is susceptible of broad utility and application. Many embodiments and adaptations of the present invention other than those described, as well as many variations, modifications and equivalent arrangements will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing an enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A moving map display for an electronic flight instrument system comprising:

a graphical map depiction; and a graphical glide range depiction.

2. A primary flight display for an electronic flight instrument comprising:

a graphical horizon depiction; and a graphical glide range depiction.

3. A method of depicting glide range for an aircraft upon the aircraft's instrument display comprising the steps of:

collecting data material to the glide range of an aircraft;

calculating from the data a glide range for the aircraft;

graphically displaying the glide range of the aircraft.

4. The method of claim 3 in which the calculation is iterative.

5. The method of claim 3 in which the data comprises wind speed.

6. The method of claim 3 in which the data comprises current position and heading.

7. The method of claim 3 in which the graphic display is a moving map display.

8. The method of claim 3 further comprising the step of graphically displaying a horizon.

9. The method of claim 4 in which the data comprises wind speed.

10. The method of claim 4 in which the data comprises air speed and heading.

11. The method of claim 4 in which the graphic display is a moving map display.

12. The method of claim 4 further comprising the step of graphically displaying a horizon.

* * * * *